(12) United States Patent
Mizukami et al.

(10) Patent No.: US 9,300,238 B2
(45) Date of Patent: Mar. 29, 2016

(54) MOTOR DRIVING DEVICE (71) Applicant: NIDEC TECHNO MOTOR CORPORATION, Kyoto (JP)

(72) Inventors: Koji Mizukami, Kyoto (JP); Hiroyuki Shitabo, Kyoto (JP)

(73) Assignee: NIDEC TECHNO MOTOR CORPORATION (JP)

( * ) Notice: Subject to any disclaimer, the term of this patent is extended or adjusted under 35 U.S.C. 154(b) by 0 days.

(21) Appl. No.: 14/471,050

(22) Filed: Aug. 28, 2014

(65) Prior Publication Data
US 2015/0061552 A1 Mar. 5, 2015

(30) Foreign Application Priority Data

Aug. 28, 2013 (JP) .................................. 2013-176216

(51) Int. Cl.
*H02P 27/00* (2006.01)
*H02P 23/00* (2006.01)

(52) U.S. Cl.
CPC ...................................... *H02P 23/00* (2013.01)

(58) Field of Classification Search
CPC ... H02P 27/08; H02P 21/145; H02P 23/0081; H02P 23/08; H02P 6/001; H02P 6/20; B60L 15/025; B60L 2210/10; H02M 2001/0009; H02M 7/48; H02M 7/483; H02M 7/53875; H02M 7/5388; H02M 7/5395
USPC ............. 318/400.3, 400.11, 400.35, 432, 799
See application file for complete search history.

(56) References Cited

U.S. PATENT DOCUMENTS

| | | | |
|---|---|---|---|
| 2004/0130287 A1* | 7/2004 | Sadasivam et al. | 318/799 |
| 2006/0273748 A1* | 12/2006 | Yoshimoto et al. | 318/432 |
| 2010/0039056 A1* | 2/2010 | Kobayashi et al. | 318/400.35 |
| 2011/0031914 A1* | 2/2011 | Green et al. | 318/400.11 |

FOREIGN PATENT DOCUMENTS

JP   2010022150 A   1/2010

* cited by examiner

*Primary Examiner* — Paul Ip
(74) *Attorney, Agent, or Firm* — Cantor Colburn LLP (57) ABSTRACT

A motor driving device includes a microcomputer, a command voltage adjusting circuit, and a driving IC. The command voltage adjusting circuit converts a first command voltage signal from the microcomputer to a second command voltage signal. The driving IC generates a drive pulse based on the second command voltage signal. An upper and a lower limit of an input voltage range of the driving IC are larger than an upper and a lower limit of a voltage range of the first command voltage signal, respectively.

9 Claims, 9 Drawing Sheets

MOTOR DRIVING DEVICE

CROSS REFERENCE TO RELATED APPLICATION

The present invention claims priority under 35 U.S.C. §119 to Japanese Application No. 2013-176216 filed Aug. 28, 2013, the entire content of which is incorporated herein by reference.

FIELD OF THE INVENTION

The present invention relates to a motor driving device.

BACKGROUND

Conventionally, there is known a motor driving device that includes a microcomputer having a CPU, a driving IC for generating drive pulses in response to a signal transmitted from the CPU, and an inverter for supplying a driving current to a motor in response to the drive pulses transmitted from the driving IC.

A motor control system employed in the conventional motor driving device is disclosed in, e.g., Japanese Patent Application Publication No. 2010-22150. In the motor control system of Japanese Patent Application Publication No. 2010-22150, a PWM signal output unit corresponding to the driving IC is mounted together with a microcomputer having a CPU on the same chip (see paragraphs 0009 and 0014).

If the driving IC is mounted together with the microcomputer on the same chip as in the motor control system disclosed in Japanese Patent Application Publication No. 2010-22150, the chip including the microcomputer and the driving IC needs to be replaced as a whole in order to implement different variations depending on the kind and purpose of a motor. Meanwhile, if the driving IC and the microcomputer are installed independently of each other, the variations of a motor driving device can be broadened by combining different kinds of driving ICs and different kinds of microcomputers. Therefore, in order to implement different variations, it is preferable to install the driving IC and the microcomputer independently of each other.

However, when the driving IC and the microcomputer are installed independently of each other, it is sometimes the case that the output voltage range of the microcomputer and the input voltage range of the driving IC differ from each other. In that case, if the voltage signal outputted from the microcomputer is directly inputted to the driving IC, the input voltage range of the driving IC cannot be used in its entirety. Thus, the operation of the motor is limited. In particular, if the upper limit and the lower limit of the output voltage range of the microcomputer are respectively different from the upper limit and the lower limit of the input voltage, a reduction in the resolution of a voltage signal cannot be avoided by merely adjusting the magnification of the output voltage of the microcomputer.

At least an embodiment of the present invention provides a motor driving device capable of suppressing a reduction in the resolution of a voltage signal supplied from a microcomputer to a driving IC.

SUMMARY

At least an embodiment of the present invention a motor driving device for driving a motor, which includes a microcomputer, a command voltage adjusting circuit, a driving IC and an inverter. The microcomputer is configured to, based on a rotation command signal inputted from the outside, output a first command voltage signal which falls within a predetermined voltage range. The command voltage adjusting circuit is configured to convert the first command voltage signal to a second command voltage signal which falls within a voltage range differing from the predetermined voltage range. The driving IC is configured to, based on the second command voltage signal, generate a drive pulse. The inverter is configured to, based on the drive pulse, supply a drive current to the motor. An upper limit of an input voltage range of the driving IC is larger than an upper limit of the predetermined voltage range of the first command voltage signal, and a lower limit of the input voltage range of the driving IC is larger than a lower limit of the predetermined voltage range of the first command voltage signal. Further, the command voltage adjusting circuit is configured to set an upper limit of the second command voltage signal to become larger than the upper limit of the first command voltage signal and equal to or larger than the upper limit of the input voltage range of the driving IC and is configured to set a lower limit of the second command voltage signal to become larger than the lower limit of the first command voltage signal and equal to or smaller than the lower limit of the input voltage range of the driving IC.

In accordance with the illustrative embodiment, the command voltage adjusting circuit shifts the upper and the lower limit of the first command voltage signal outputted from the microcomputer. This makes it possible to narrow the voltage range falling outside the input voltage range of the driving IC among the voltage range of the second command voltage signal inputted to the driving IC. As a result, it is possible to suppress a reduction in the resolution of the signal inputted to the driving IC.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will now be described with reference to the drawings which form a part hereof.

Figure 1:
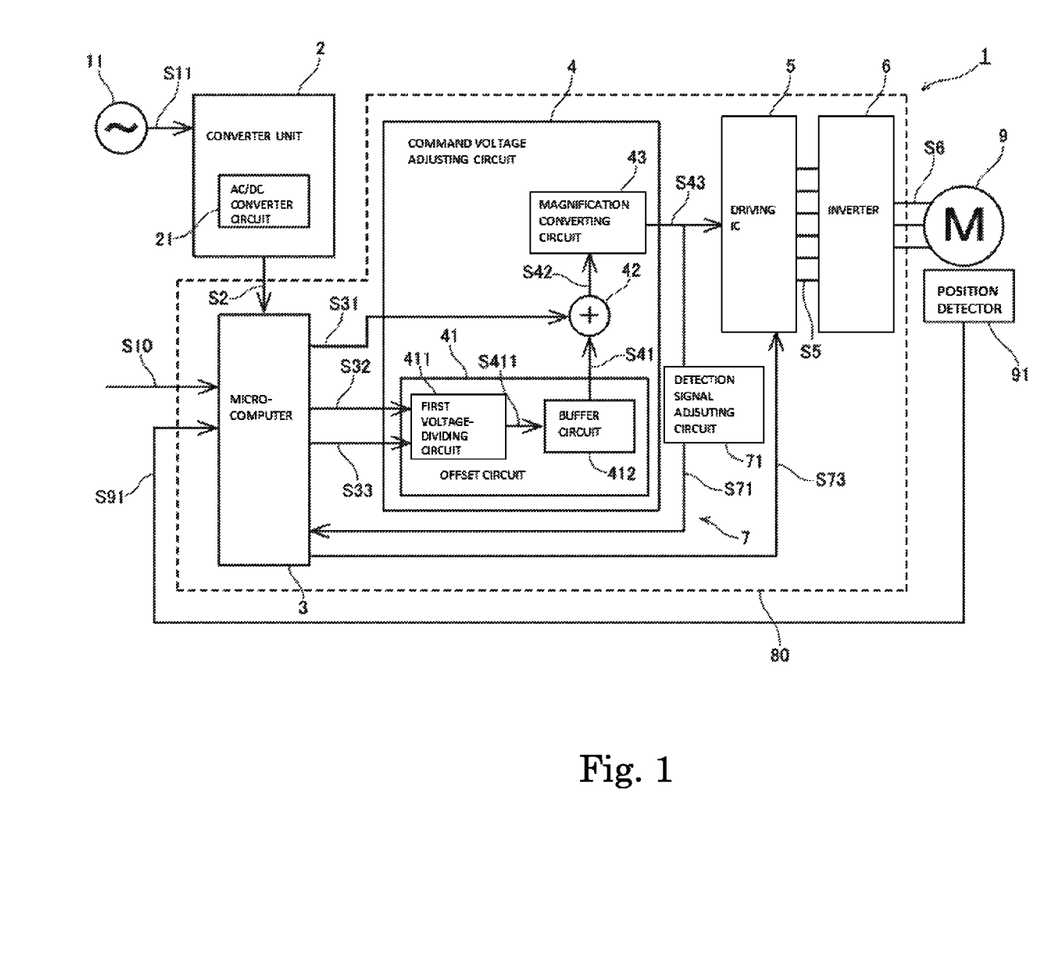
FIG. 1 is a block diagram showing the configuration of a motor driving device according to one preferred embodiment.
Figure 2:
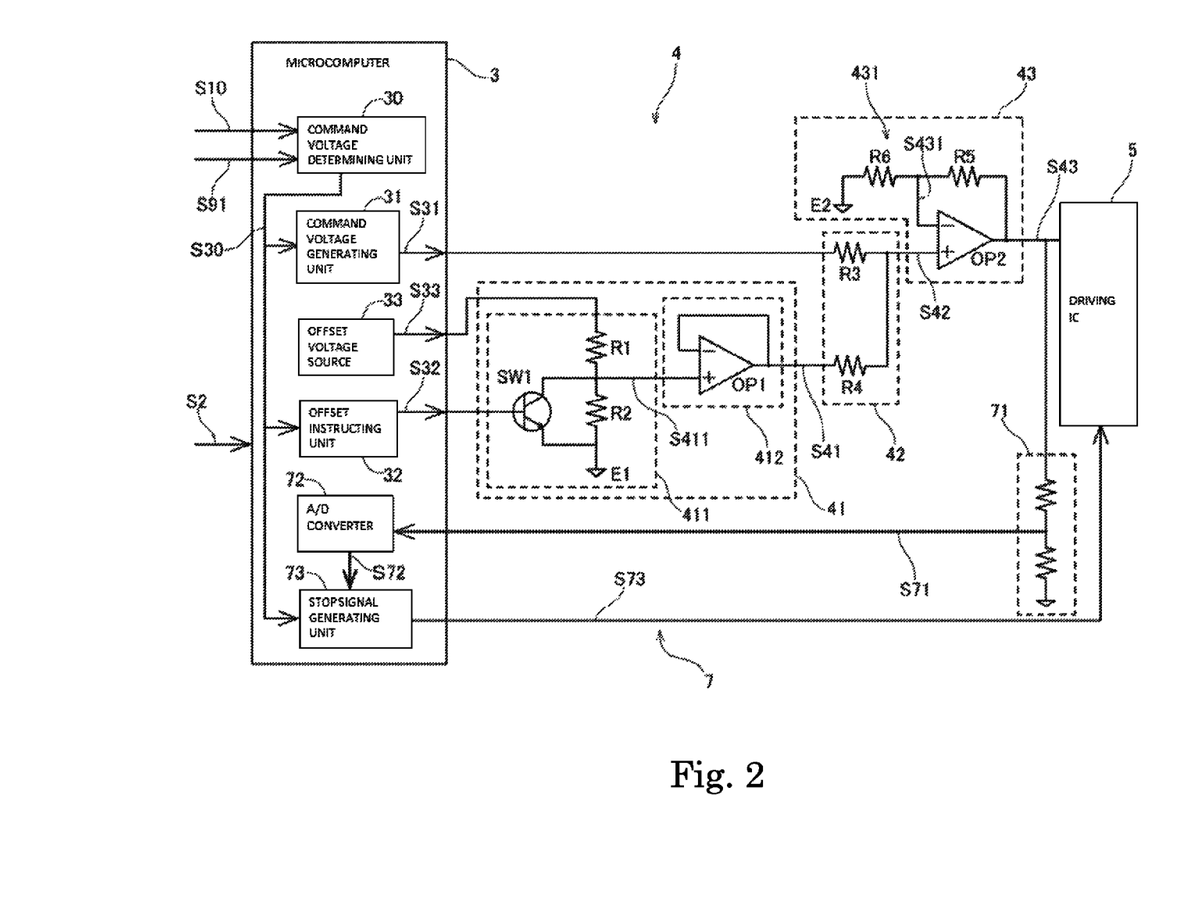
FIG. 2 is a circuit diagram of a command voltage adjusting circuit according to the preferred embodiment.

First, description will be made on the overall configuration of a motor driving device 1. FIG. 1 is a block diagram conceptually illustrating the configuration of the motor driving device 1. FIG. 2 is a circuit diagram of a command voltage adjusting circuit 4. The motor driving device 1 is a device that drives a motor 9 by supplying a drive current to the motor 9.

In one embodiment of the present invention, the motor 9 to be driven by the motor driving device 1 is a three-phase brushless DC motor. The motor 9 preferably includes stator coils of individual phases, namely a U-phase, a V-phase and a W-phase. If a drive current is supplied to the stator coils of individual phases, torque is generated between a stator and a rotor. Thus, the rotor is rotationally driven. Alternatively, the motor to be driven by the motor driving device according to one embodiment of the present invention may be a single-phase motor or a brush motor.

The motor 9 preferably includes a position detector 91. The position detector 91 detects the position of the rotor of the motor 9 and delivers the detection result as a position information signal S91 to the motor driving device 1. The position detector 91 detects the position of the rotor by, e.g., combining the signals outputted from three magnetic sensors arranged at an interval of 120 degrees in electric angle.

As shown in FIG. 1, the motor driving device 1 preferably includes a converter unit 2, a microcomputer 3, a command voltage adjusting circuit 4, a driving IC 5, an inverter 6 and an abnormality detecting unit 7.

The converter unit 2 preferably includes an AC/DC converter circuit 21. The converter unit 2 converts an AC voltage S11 inputted from an external AC voltage source 11 to a DC voltage. The converter unit 2 generates a control voltage S2 from the DC voltage and outputs the control voltage S2 to the microcomputer 3. In the present preferred embodiment, the motor driving device 1 includes the converter unit 2, so that the motor 9, which is a brushless DC motor, can be driven with an AC power source.

As shown in FIG. 2, the microcomputer 3 preferably includes a command voltage determining unit 30, a command voltage generating unit 31, an offset instructing unit 32 and an offset voltage source 33. The microcomputer 3 outputs a first command voltage signal S31 and an ON/OFF signal S32 based on a rotation command signal S10 inputted from the outside of the motor driving device 1 and a position information signal S91 for the rotor of the motor 9, which will be described later.

The command voltage determining unit 30 determines a count number S30, which corresponds to a voltage of the first command voltage signal S31 based on the rotation command signal S10 and the position information signal S91. Then, the command voltage determining unit 30 outputs the count number S30 to the command voltage generating unit 31, the offset instructing unit 32 and a stop signal generating unit 73 to be described later.

Figure 3:
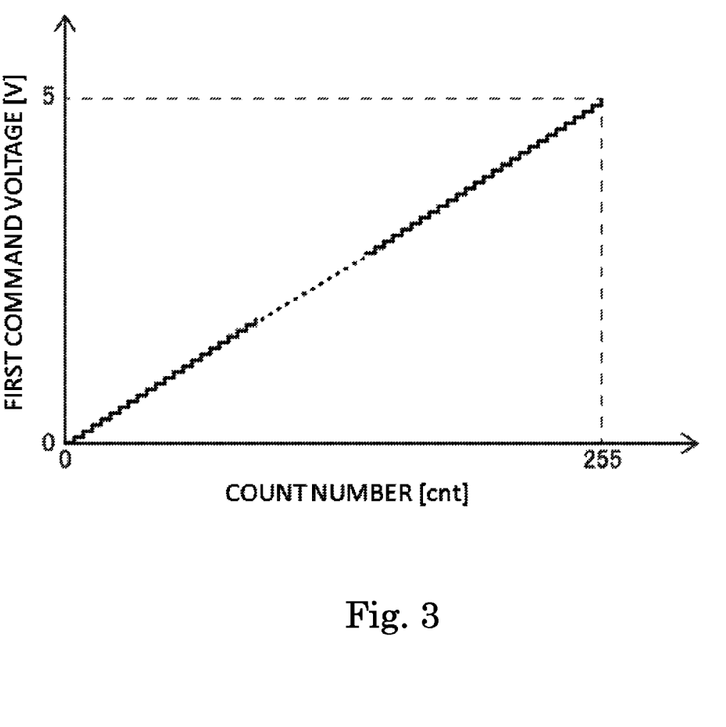
FIG. 3 is a graph representing the relationship between a count number and a first command voltage in the motor driving device according to the preferred embodiment.

Based on the count number S30, the command voltage generating unit 31 generates the first command voltage signal S31. The command voltage generating unit 31 of the present preferred embodiment is a D/A converter that generates the first command voltage signal S31 by digital-to-analog (D/A) converting the count number S30. FIG. 3 is a graph representing the relationship between the count number S30 and the first command voltage signal S31. In the present preferred embodiment, the count number S30 is indicated by 8 bits and 256 counts. Therefore, the count number S30 takes a value of 0 to 255 cnt.

While the command voltage generating unit 31 of the present preferred embodiment is a D/A converter that directly outputs an analog voltage, the present invention is not limited thereto. For example, the command voltage generating unit 31 may be configured to, based on the count number S30, generate a PWM signal as the first command voltage signal S31. In this case, there is provided a configuration in which the PWM signal is converted to an analog voltage by integrating the PWM signal with a CR integration circuit (not shown) inserted between the command voltage determining unit 31 and the input end of a third resistor R3 of an adder circuit 42 to be described later.

The first command voltage signal S31 is a voltage signal which falls within a predetermined voltage range. In the present preferred embodiment, the voltage range of the first command voltage signal S31 is from 0 V to 5V. As shown in FIG. 3, the command voltage generating unit 31 generates the first command voltage signal S31 proportional to the count number S30 such that the first command voltage signal S31 becomes 0 V when the count number S30 is 0 cnt and such that the first command voltage signal S31 becomes 5 V when the count number S30 is 255 cnt.

The offset instructing unit 32 outputs an ON/OFF signal S32 to an offset circuit 41 based on the count number S30 inputted from the command voltage deciding unit 30. Thus, the offset instructing unit 32 instructs the offset circuit 41 whether to generate an offset voltage S41 or not. When the count number S30 is not inputted, the ON/OFF signal S32 becomes an OFF signal which is a voltage signal of a voltage higher than 0 V. When the count number S30 is inputted, the ON/OFF signal S32 becomes an ON signal which is a voltage signal of 0 V.

The offset voltage source 33 supplies a normal voltage S33 normally outputted during the operation of the microcomputer 3 to a first voltage-dividing circuit 411 to be described later. In the present preferred embodiment, the normal voltage S33 is 5 V.

The command voltage adjusting circuit 4 is a circuit that converts the first command voltage signal S31 outputted from the microcomputer 3 to a second command voltage signal S43 depending on the input voltage range of the driving IC 5. As shown in FIG. 1, the command voltage adjusting circuit 4 preferably includes the offset circuit 41, the adder circuit 42 and a magnification converting circuit 43.

Figure 4:
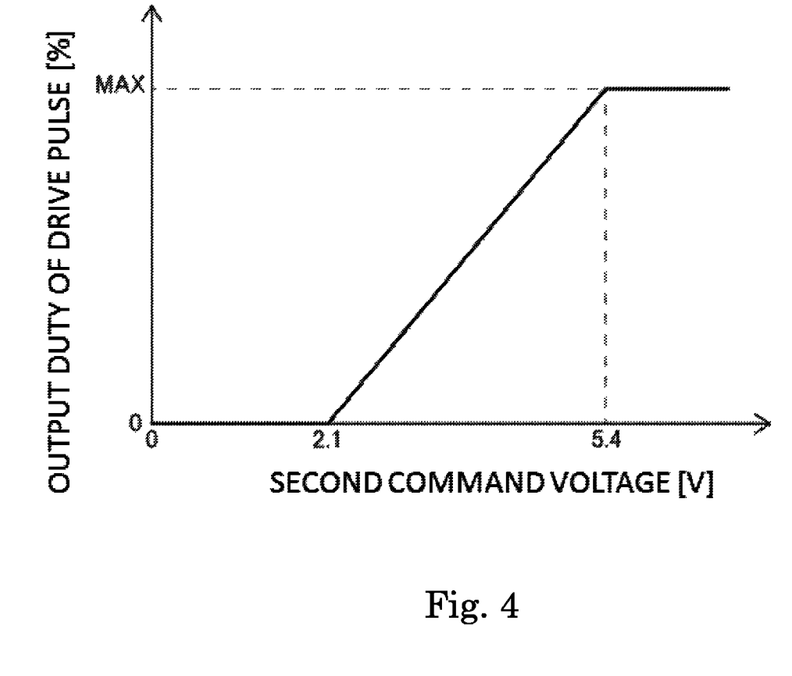
FIG. 4 is a graph representing the relationship between a second command voltage and an output duty of a driving IC in the motor driving device according to the preferred embodiment.

FIG. 4 is a graph representing the relationship between the second command voltage signal S43 inputted to the driving IC 5 and an output duty of a drive pulse S5 outputted from the driving IC 5. In the present preferred embodiment, as shown in FIG. 4, the input voltage range of the driving IC 5 is from 2.1 V to 5.4 V. That is, the upper limit, 5.4 V, of the input voltage range of the driving IC 5 is larger than the upper limit, 5 V, of the voltage range of the first command voltage signal S31. Moreover, the lower limit, 2.1 V, of the input voltage range of the driving IC 5 is larger than the lower limit, 0 V, of the voltage range of the first command voltage signal S31.

The command voltage adjusting circuit 4 is a voltage adjusting circuit that converts a first command voltage signal S31 having a voltage range of 0 to 5 V to a second command voltage signal S43 having a voltage range of 1.9 to 5.6 V. In the present preferred embodiment, taking the manufacturing error of the driving IC into account, the upper and the lower limit of the voltage range of the second command voltage signal S43 are set at the values more affordable than the upper and the lower limit of the input voltage range as the rated values of the driving IC 5.

In this way, the command voltage adjusting circuit 4 sets the upper limit of the second command voltage signal S43 to become 5.6 V which is higher than the upper limit, 5 V, of the first command voltage signal S31 and which is higher than the upper limit, 5.4 V, of the input voltage range of the driving IC 5. Moreover, the command voltage adjusting circuit 4 sets the lower limit of the second command voltage signal S43 to become 1.9 V which is higher than the lower limit, 0 V, of the first command voltage signal S31 and which is lower than the lower limit, 2.1 V, of the input voltage range of the driving IC 5.

The upper limit and the lower limit of the second command voltage signal S43 may be respectively set at the voltage values equal to the upper limit, 5.4 V, and the lower limit, 2.1 V, of the input voltage range of the driving IC 5. Moreover, the upper limit of the second command voltage signal S43 may be set a little smaller than the upper limit of the input voltage range of the driving IC 5 within permissible limits of error.

In the present preferred embodiment, the command voltage adjusting circuit 4 sets the upper limit of the second command voltage signal S43 to become larger than the upper limit of the input voltage range of the driving IC 5. Moreover, the command voltage adjusting circuit 4 sets the lower limit of the second command voltage signal S43 to become smaller than the lower limit of the input voltage range of the driving IC 5. When the voltage range of the second command voltage signal S43 is broader than the input voltage range of the driving IC 5 as set forth above, the input voltage range of the driving IC 5 can be used without waste even when there exists the manufacturing error in the input voltage range of the driving IC 5.

The offset circuit 41 is a circuit that generates the offset voltage S41 based on the ON/OFF signal S32 and supplies the generated offset voltage S41 to the adder circuit 42. The offset circuit 41 preferably includes the first voltage-dividing circuit 411 and a buffer circuit 412.

When the ON/OFF signal S32 is an ON signal, the first voltage-dividing circuit 411 divides the normal voltage S33 to thereby generate a pre-adjustment offset voltage S411. The pre-adjustment offset voltage S411 thus generated is outputted to the buffer circuit 412. When the ON/OFF signal S32 is an OFF signal, the first voltage-dividing circuit 411 does not output the pre-adjustment offset voltage S411.

The buffer circuit 412 is a circuit that converts the pre-adjustment offset voltage S411 supplied from the first voltage-dividing circuit 411 to an offset voltage S41 having a stable voltage value. Since the buffer circuit 412 is interposed between the first voltage-dividing circuit 411 and the adder circuit 42, the first voltage-dividing circuit 411 is not affected by a current change at the side of the adder circuit 42. Thus, the voltage value of the offset voltage S41 outputted from the offset circuit 41 becomes stable.

The adder circuit 42 is a circuit that generates an adder voltage S42 by adding the first command voltage signal S31 and the offset voltage S41 at a predetermined ratio. The adder circuit 42 outputs the generated adder voltage S42 to the magnification converting circuit 43.

The magnification converting circuit 43 generates a second command voltage signal S43 by converting the magnification of the adder voltage S42. The second command voltage signal S43 thus generated is outputted to the driving IC 5. By virtue of the adder circuit 42 and the magnification converting circuit 43, the second command voltage signal S43 can be outputted as a voltage, which is obtained by converting the first command voltage signal S31 and the offset voltage S41 at an arbitrary magnification and then adding the first command voltage signal S31 and the offset voltage S41.

Figure 5:
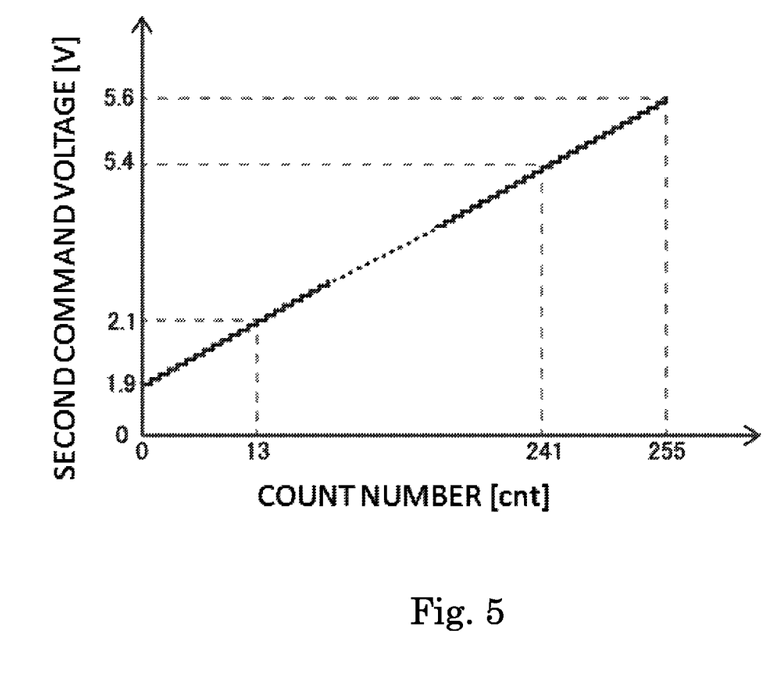
FIG. 5 is a graph representing the relationship between a count number and a second command voltage in the motor driving device according to the preferred embodiment.

With the configuration described above, the command voltage adjusting circuit 4 converts the first command voltage signal S31 having a voltage range of 0 to 5 V to the second command voltage signal S43 having a voltage range of 1.9 to 5.6 V. FIG. 5 is a graph representing the relationship between the count number S30 outputted from the command voltage determining unit 30 of the microcomputer 3 and the second command voltage signal S43. As shown in FIG. 5, when the count number S30 is 0 cnt, the second command voltage signal S43 is 1.9 V. When the count number S30 is the maximum of 255 cnt, the second command voltage signal S43 is 5.6 V.

By shifting the lower and the upper limit of the first command voltage signal S31 to adjust the second command voltage signal S43 in the aforementioned manner, the range of 229 counts in which the count number S30 is from 13 to 241 cnt can be used as an input signal inputted to the driving IC 5.

Figure 6:
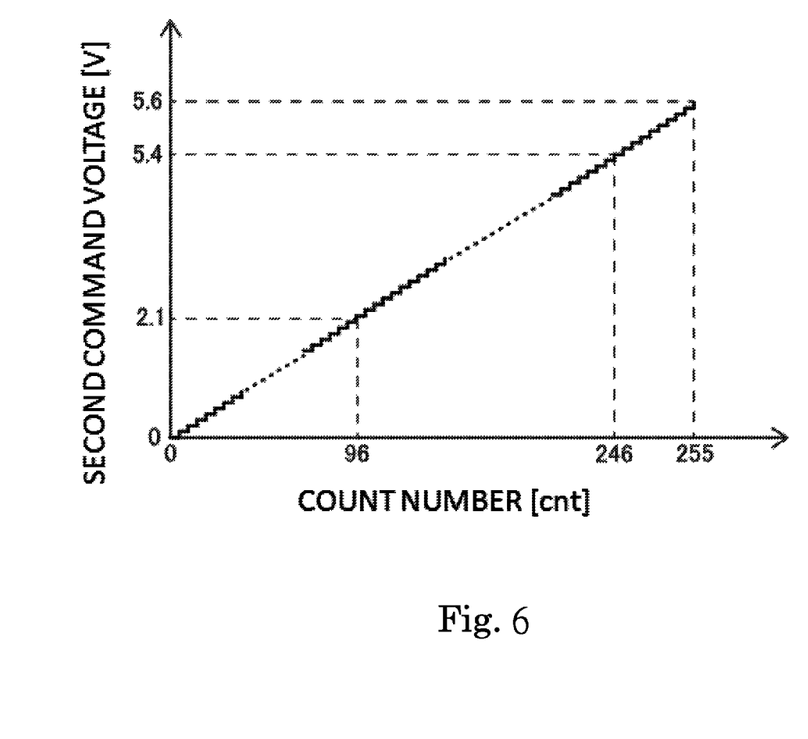
FIG. 6 is a graph representing the relationship between a count number and a second command voltage in a motor driving device according to a comparative example.

In this regard, FIG. 6 is a graph representing the relationship between the count number and the second command voltage signal in a comparative example where the command voltage adjusting circuit merely amplifies the first command voltage signal having a voltage range of 0 to 5 V by 1.12 times to output the second command voltage signal having a voltage range of 0 to 5.6 V. When the second command voltage signal is adjusted in such a manner that the upper limit of the first command voltage signal is merely shifted, the count number, which corresponds to the second command voltage signal of 2.1 to 5.6 V, namely which can be used as an input signal inputted to the driving IC 5, is 151 counts from 96 to 246 cnt.

In contrast, when the second command voltage signal S43 is adjusted by shifting both the upper and the lower limit of the first command voltage signal S31 as in the present preferred embodiment, the section of the voltage range of the second command voltage signal S43, which falls outside the input voltage range of the driving IC 5, is narrowed. Therefore, as compared with a case where the second command voltage signal is adjusted by shifting only the upper limit of the first command voltage signal, a resolution of the second command voltage signal per one count is enhanced.

The driving IC 5 generates the drive pulse S5 as a PWM signal based on the second command voltage signal S43. The drive pulse S5 thus generated is outputted to the inverter 6. As shown in FIG. 4, the output duty of the drive pulse S5 outputted from the driving IC 5 grows larger in proportion to the second command voltage signal S43 within the input voltage range of 2.1 to 5.4 V.

The inverter 6 supplies a drive current S6 to the motor 9 based on the drive pulse S5 inputted from the driving IC 5. The inverter 6 is configured by six switching elements. With respect to the individual phases, namely a U-phase, a V-phase and a W-phase, a pair of drive pulses S5 is inputted to the inverter 6. The inverter 6 generates a drive current S6 by switching the drive timings of the respective switching elements. Thus, the rotation of the motor 9 is controlled.

In a case when the second command voltage signal S43 has an abnormal voltage value, the abnormality detecting unit 7 outputs a stop signal S73 to stop the driving IC 5. As shown in FIG. 2, the abnormality detecting unit 7 preferably includes a detection signal adjusting circuit 71, an A/D (analog/digital) converter 72 and a stop signal generating unit 73.

The detection signal adjusting circuit 71 adjusts the second command voltage signal S43 to fall within a voltage range, which can be inputted to the A/D converter 72, and outputs a first detection signal S71. In the present preferred embodiment, the voltage range of the second command voltage signal S43 is from 1.9 V to 5.6 V. In contrast, the range of the voltage which can be inputted to the A/D converter 72 included in the microcomputer 3 is from 0 V to 5 V. For that reason, a voltage-dividing circuit having two resistors as shown in FIG. 2 is used as the detection signal adjusting circuit 71 of the present preferred embodiment. Depending on the resistance ratio of the two resistors, the detection signal adjusting circuit 71 divides the voltage of the second command voltage signal S43 of 1.9 to 5.6 V to convert the second command voltage signal S43 to, e.g., a first detection signal S71 of 0.95 to 2.8 V. The A/D converter 72 performs analog-to-digital convert in which the first detection signal S71 is converted to a second detection signal S72 as a digital signal.

By comparing the count number S30 inputted from the command voltage determining unit 30 with the second detection signal S72 inputted from the A/D converter 72, the stop signal generating unit 73 determines whether the second command voltage signal S43 is a value corresponding to the count number S30. If the second detection signal S72 and the count number S30 are in a predetermined corresponding relationship, the stop signal generating unit 73 determines that there is no abnormality. Thus, the stop signal generating unit 73 does not output a stop signal S73 to the driving IC 5. If the second detection signal S72 and the count number S30 are not in the predetermined corresponding relationship, the stop signal generating unit 73 determines that there is an abnormality. Thus, the stop signal generating unit 73 outputs a stop signal S73 to the driving IC 5. When the stop signal S73 is inputted, the driving IC 5 stops its operation regardless of the voltage of the second command voltage signal S43. When the motor driving device 1 includes the abnormality detecting unit 7, it becomes possible to avoid a situation that the motor 9 is continuously driven and cannot be stopped when a malfunction is generated in the command voltage adjusting circuit 4.

In the present preferred embodiment, the A/D converter 72 and the stop signal generating unit 73 are a part of the microcomputer 3. However, the present invention is not limited thereto. The A/D converter 72 and the stop signal generating unit 73 may be realized by a microcontroller differing from the microcomputer 3 or by other configurations.

As indicated by a broken line in FIG. 1, the microcomputer 3, the command voltage adjusting circuit 4, the driving IC 5, the inverter 6 and the abnormality detecting unit 7 are arranged on one substrate 80. This makes it possible to reduce the number of assembling steps when assembling the motor driving device 1 and the motor 9.

Next, a specific circuit configuration example for realizing the command voltage adjusting circuit 4 will be described with reference to FIG. 2.

The first voltage-dividing circuit 411 of the offset circuit 41 preferably includes a first resistor R1, a second resistor R2 and a switching element SW1. One end of the first resistor R1 is connected to the offset voltage source 33. That is, the normal voltage S33 is inputted to one end of the first resistor R1. One end of the second resistor R2 is connected to the other end of the first resistor R1. The other end of the second resistor R2 is grounded to an earth E1. The switching element SW1 is connected in parallel with the second resistor R2. The ON/OFF signal S32 transmitted from the offset instructing unit 32 is inputted to the switching element SW1. The voltage between the first resistor R1 and the second resistor R2 is outputted to the buffer circuit 412 as the pre-adjustment offset voltage S411.

As described above, the ON/OFF signal S32 inputted to the switching element SW1 has a voltage higher than 0 V when the ON/OFF signal S32 is an OFF signal, and has a voltage equal to 0 V when the ON/OFF signal S32 is an ON signal. For that reason, when the ON/OFF signal S32 is the OFF signal, a current flows through the switching element SW1. Accordingly, in between the offset voltage source 33 and the earth E1, a current flows through the first resistor R1 and the switching element SW1 without flowing through the second resistor R2. Thus, the pre-adjustment offset voltage S411 becomes 0 V.

When the ON/OFF signal S32 inputted to the switching element SW1 is the ON signal, a current does not flow through the switching element SW1. Thus, in between the offset voltage source 33 and the earth E1, a current flows through the first resistor R1 and the second resistor R2. Accordingly, the normal voltage S33 is divided depending on the resistance ratio of the first resistor R1 and the second resistor R2 and is outputted as the pre-adjustment offset voltage S411. In the present preferred embodiment, the normal voltage S33 is 5 V and the pre-adjustment offset voltage S411 is about 2.6 V.

The buffer circuit 412 preferably includes a first operational amplifier OP1. The pre-adjustment offset voltage S411 is inputted to the non-inverting input terminal of the first operational amplifier OP1. An output terminal and the inverting input terminal of the first operational amplifier OP1 are directly connected to each other. That is, the buffer circuit 412 is a so-called voltage follower circuit. Thus, the buffer circuit 412 stably outputs an offset voltage S41 having the same voltage value as that of the pre-adjustment offset voltage S411. That is, in the present preferred embodiment, the offset voltage S41 is about 2.6 V.

The adder circuit 42 preferably includes the third resistor R3 and a fourth resistor R4. The input end of the third resistor R3 is connected to the command voltage generating unit 31 and the output end thereof is connected to the magnification converting circuit 43. The input end of the fourth resistor R4 is connected to the buffer circuit 412 and the output end thereof is connected to the magnification converting circuit 43. The output end of the third resistor R3 and the output end of the fourth resistor R4 are connected to each other.

Accordingly, in the adder circuit 42, the first command voltage signal S31 is inputted from the input end of the third resistor R3 and the offset voltage S41 is inputted from the input end of the fourth resistor R4. The adder circuit 42 adds the first command voltage signal S31 and the offset voltage S41 depending on the resistance ratio of the third resistor R3 and the fourth resistor R4 to output the adder voltage S42 to the magnification converting circuit 43. In the present preferred embodiment, the resistance value of the third resistor R3 is equal to the resistance value of the fourth resistor R4. Thus, the adder circuit 42 adds the first command voltage signal S31 and the offset voltage S41 respectively multiplied by 0.5 and outputs the adder voltage S42 thus obtained. That is, the adder voltage S42 outputted by the adder circuit 42 is equal to the value obtained by adding about 1.3 V to the first command voltage signal S31 multiplied by 0.5.

The magnification converting circuit 43 preferably includes a second operational amplifier OP2 and a second voltage-dividing circuit 431 having a fifth resistor R5 and a sixth resistor R6. The adder voltage S42 as the output voltage of the adder circuit 42 is inputted to the non-inverting input terminal of the second operational amplifier OP2. An output terminal of the second operational amplifier OP2 is connected to the driving IC 5, whereby the second command voltage signal S43 outputted from the second operational amplifier OP2 is inputted to the driving IC 5. The output terminal of the second operational amplifier OP2 is also connected to the second voltage-dividing circuit 431.

The second voltage-dividing circuit 431 preferably includes the fifth resistor R5 and the sixth resistor R6. One end of the fifth resistor R5 is connected to the output terminal of the second operational amplifier OP2. That is, the second command voltage signal S43 is inputted to one end of the fifth resistor R5. One end of the sixth resistor R6 is connected to the other end of the fifth resistor R5. The other end of the sixth resistor R6 is grounded to an earth E2. The midpoint between the fifth resistor R5 and the sixth resistor R6 is connected to the inverting input terminal of the second operational amplifier OP2. That is, the voltage between the fifth resistor R5 and the sixth resistor R6, i.e., a divided voltage S431 outputted from the second voltage-dividing circuit 431, is inputted to the second operational amplifier OP2 as a negative feedback voltage. In other words, the magnification converting circuit 43 is a so-called non-inverting amplifier circuit. The non-inverting amplifier circuit not only converts the magnification of the input voltage but also serves as a buffer circuit. For that reason, the magnification converting circuit 43 can maintain a stable output voltage without being affected by the circuit at the output side.

While the magnification converting circuit 43 of the present preferred embodiment is a non-inverting amplifier circuit, the present invention is not limited thereto. The magnification converting circuit may be formed through the use of an inverting amplifier circuit or other amplifier circuits. The amplification factor of the magnification converting circuit 43 of the present preferred embodiment is equal to or larger than 1. However, depending on the kind of the adder circuit 42 combined, it may be possible to use the magnification converting circuit 43 having an amplification factor of less than 1.

In the present preferred embodiment, the magnification converting circuit 43 amplifies, by 1.48 times, the voltage inputted to the non-inverting input terminal of the second operational amplifier OP2. Thus, the second command voltage signal S43 outputted from the magnification converting circuit 43 has a voltage obtained by adding 1.9 V to the first command voltage signal S31 multiplied by 0.74. That is, when the voltage range of the first command voltage signal S31 is from 0 V to 5 V, the voltage range of the second command voltage signal S43 is from 1.9 V to 5.6 V.

In the present preferred embodiment, there is provided a dual amplifier in which the first operational amplifier OP1 of the offset circuit 41 and the second operational amplifier OP2 of the magnification converting circuit 43 are formed into a single package. Since the first operational amplifier OP1 and the second operational amplifier OP2 are formed into a single package, the physical configuration on the substrate 80 becomes simple.

While one illustrative preferred embodiment of the present invention has been described above, the present invention is not limited to the aforementioned embodiment.

Figure 7:
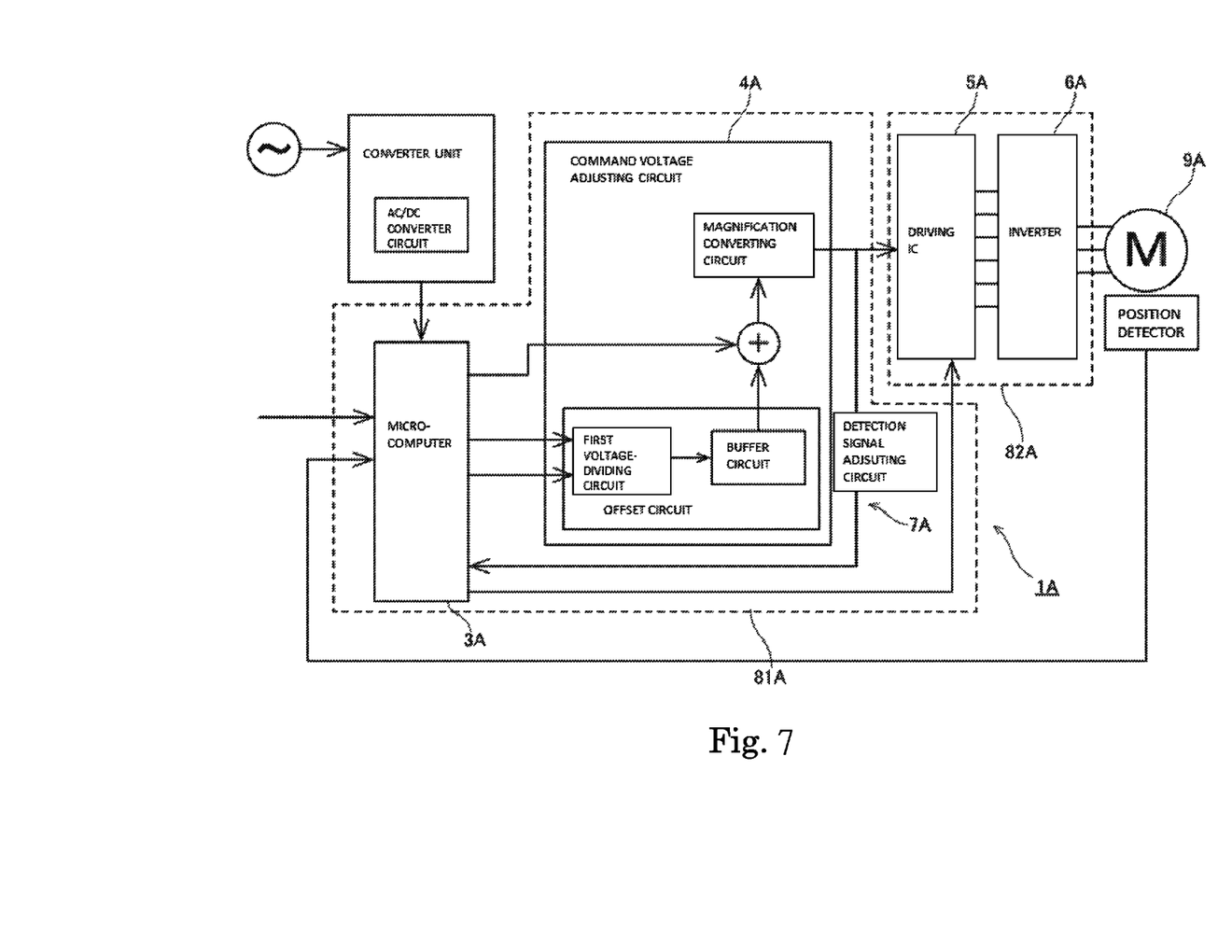
FIG. 7 is a block diagram showing the configuration of a motor driving device according to a modified example.

FIG. 7 is a block diagram showing the configuration of a motor driving device 1A according to one modified example. In the example shown in FIG. 7, as indicated by a broken line, a microcomputer 3A, a command voltage adjusting circuit 4A and an abnormality detecting unit 7A are arranged on one substrate 81A. A driving IC 5A and an inverter 6A are arranged on another substrate 82A. The substrate 82A is mounted to a motor 9A. In case where a control operation is performed with respect to the motor 9A including the driving IC 5A and the inverter 6A, a motor driving device 1A according to the present modified example can be implemented by preparing the substrate 81A including the microcomputer 3A and the command voltage adjusting circuit 4A of the present modified example.

Figure 8:
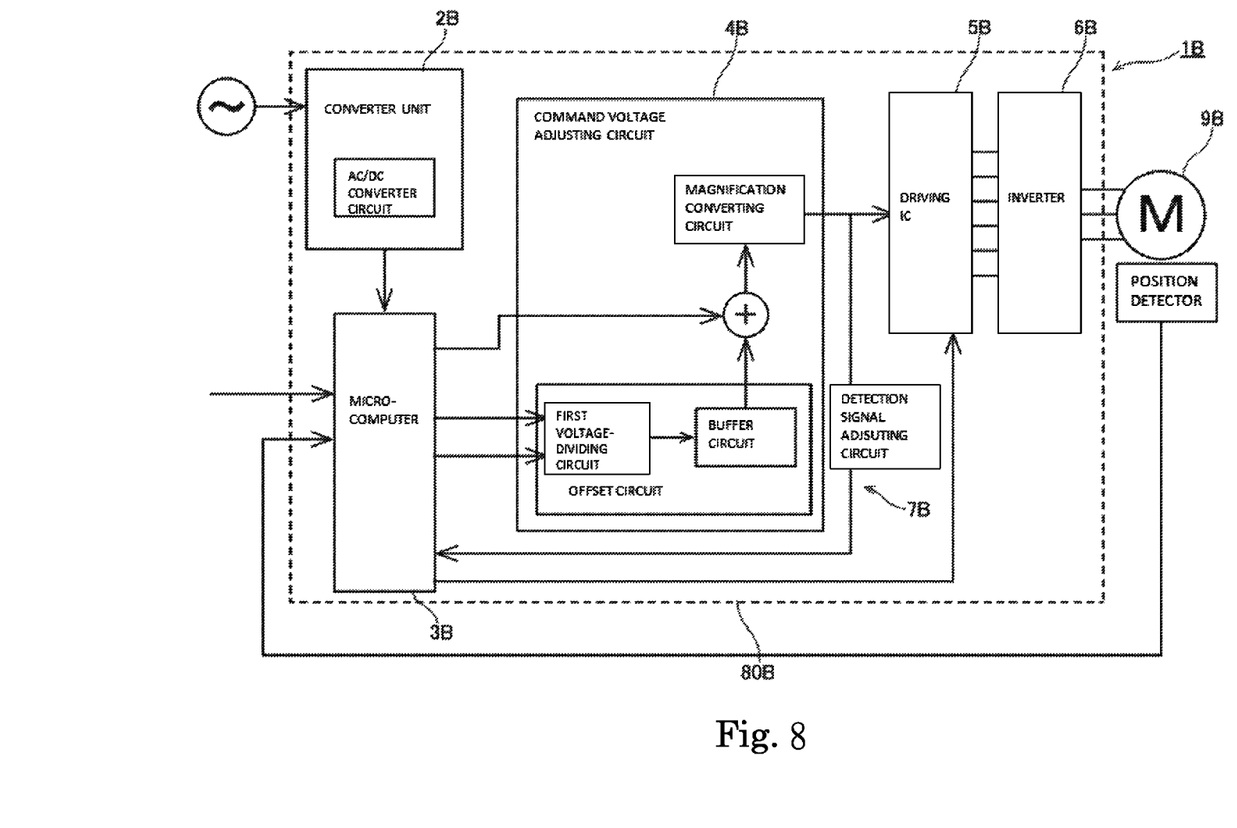
FIG. 8 is a block diagram showing the configuration of a motor driving device according to another modified example.

FIG. 8 is a block diagram showing the configuration of a motor driving device 1B according to another modified example. In the example shown in FIG. 8, as indicated by a broken line, a converter unit 2B, a microcomputer 3B, a command voltage adjusting circuit 4B, a driving IC 5B, an inverter 6B and an abnormality detecting unit 7B are arranged on one substrate 80B. The substrate 80B is mounted to a motor 9B. In this way, all elements other than a power source may be mounted to the motor 9B.

Figure 9:
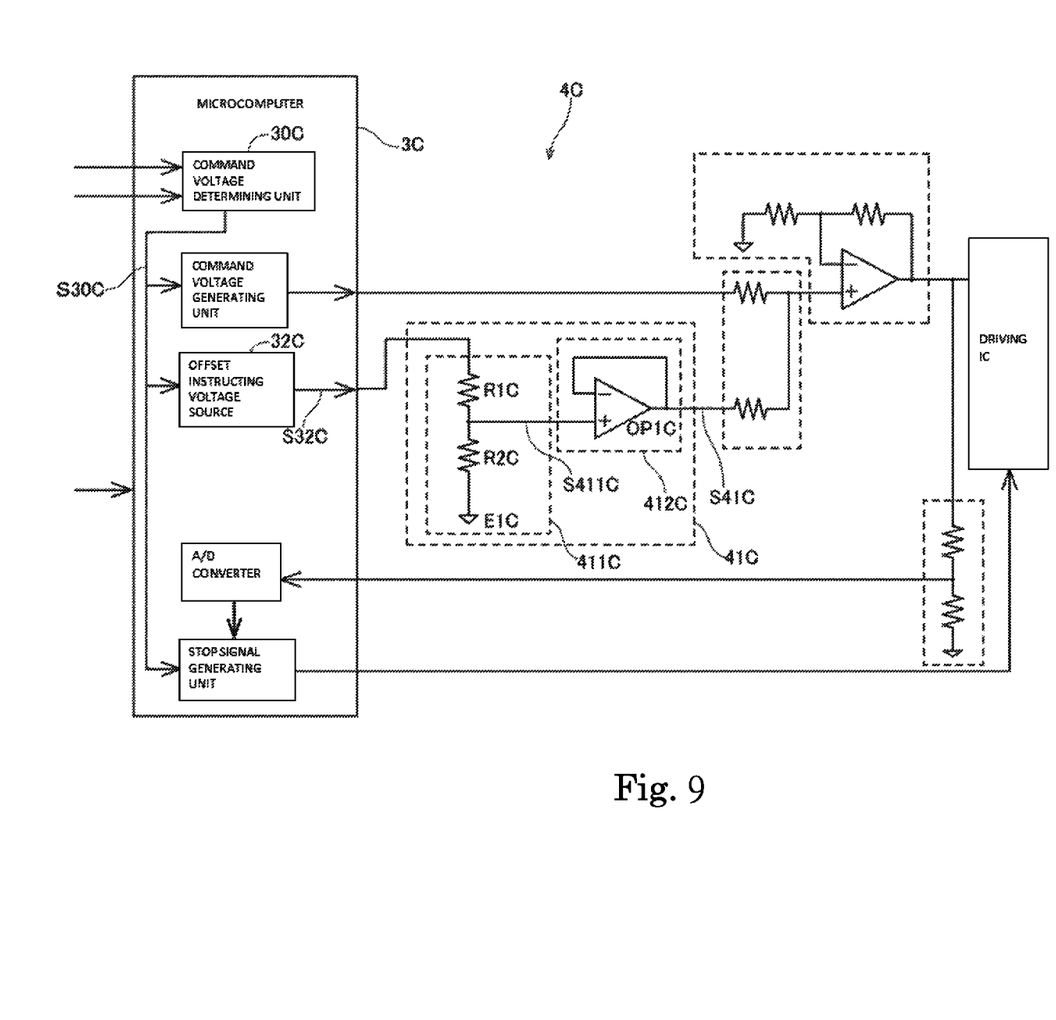
FIG. 9 is a circuit diagram of a command voltage adjusting circuit according to a further modified example.

FIG. 9 is a circuit diagram of a command voltage adjusting circuit 4C according to a further modified example. In the example shown in FIG. 9, a microcomputer 3C includes an offset instructing voltage source 32C. The offset instructing voltage source 32C serves as the offset instructing unit and the offset voltage source. A first voltage-dividing circuit 411C of an offset circuit 41C does not include the switching element. It is therefore possible to simplify the configuration of a microcomputer 3C and the circuit configuration of the command voltage adjusting circuit 4C.

The offset instructing voltage source 32C outputs an offset command voltage S32C to the offset circuit 41C based on a count number S30C inputted from a command voltage determining unit 30C. Thus, the offset instructing voltage source 32C instructs the offset circuit 41C whether to generate an offset voltage S41C or not and supplies a voltage for generating the offset voltage S41C. In the present modified example, when the count number S30C is not inputted, the offset command voltage S32C is 0 V. When the count number S30C is inputted, the offset command voltage S32C becomes 5 V.

The first voltage-dividing circuit 411C preferably includes a first resistor R1C and a second resistor R2C. One end of the first resistor R1C is connected to the offset instructing voltage source 32C. That is, the offset command voltage S32C is inputted to one end of the first resistor R1C. One end of the second resistor R2C is connected to the other end of the first resistor R1C. The other end of the second resistor R2C is grounded to an earth E1C. Thus, the offset command voltage S32C is divided depending on the resistance ratio of the first resistor R1C and the second resistor R2C and is outputted as a pre-adjustment offset voltage S411C.

In the example shown in FIG. 9, when the offset command voltage S32C is 5 V, the pre-adjustment offset voltage S411C is about 2.6 V. When the offset command voltage S32C is 0 V, the pre-adjustment offset voltage S411C is 0 V. With this configuration, as in the aforementioned embodiment, the pre-adjustment offset voltage S411C becomes 0 V when the count number S30C is not inputted and the pre-adjustment offset voltage S411C becomes a voltage having a predetermined voltage when the count number S30C is inputted.

Further, in the aforementioned embodiment, the first operational amplifier of the offset circuit and the second operational amplifier of the magnification converting circuit are included in one dual amplifier. However, the present invention is not limited thereto. It may be possible to use two single amplifiers in which case the first operational amplifier and the second operational amplifier are installed independently of each other.

The number of the operational amplifiers included in the motor driving device is not limited to two. For example, the first command voltage signal outputted from the command voltage generating unit may be inputted to the adder circuit through the buffer circuit having an operation amplifier. In this way, the motor driving device may include three or more operation amplifiers. In case where the motor driving device includes three or more operation amplifiers, the motor driving device may include a quadruple amplifier in which four operation amplifiers are formed into one package.

Moreover, the specific circuit configuration for realizing the respective parts of the motor driving device may differ from the circuit configuration shown in FIG. 2. The respective elements employed in the preferred embodiment and the modified examples described above may be appropriately combined as long as no conflict arises.

Industrial Applicability

At least an embodiment of present invention can be used in a motor driving device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor driving device for driving a motor, comprising:
    a microcomputer structured to output a direct current first command voltage signal which falls within a predetermined first voltage range based on a rotation command signal inputted from the outside;
    a command voltage adjusting circuit structured to convert the first command voltage signal to a direct current second command voltage signal which falls within a second voltage range differing from the predetermined first voltage range;
    a driving IC structured to generate a drive pulse based on the second command voltage signal; and
    an inverter structured to supply a drive current to the motor based on the drive pulse,
    wherein an upper limit of an input voltage range of the driving IC is larger than an upper limit of the predetermined voltage range of the first command voltage signal, and a lower limit of the input voltage range of the driving IC is larger than a lower limit of the predetermined voltage range of the first command voltage signal,
    the command voltage adjusting circuit is structured to set an upper limit of the second voltage range to become larger than the upper limit of the predetermined first voltage range and equal to or larger than the upper limit of the input voltage range of the driving IC, and is structured to set a lower limit of the second voltage range to become larger than the lower limit of the predetermined first voltage range and equal to or smaller than the lower limit of the input voltage range of the driving IC; and
    wherein the command voltage adjusting circuit comprises an offset circuit structured to supply an offset voltage based on an ON/OFF signal, an adder circuit structured to add the first command voltage signal and the offset voltage, and a magnification converting circuit structured to convert a magnification of an output voltage of the adder circuit; and the microcomputer comprises an offset instructing unit structured to send the ON/OFF signal to the offset circuit.

2. The motor driving device of claim 1, wherein the command voltage adjusting circuit is structured to set the lower limit of the second voltage range to become smaller than the lower limit of the input voltage range of the driving IC.

3. The motor driving device of claim 1, wherein the command voltage adjusting circuit is structured to set the upper limit of the second voltage range to become larger than the upper limit of the input voltage range of the driving IC.

4. The motor driving device of claim 1, wherein the offset circuit comprises a first voltage-dividing circuit structured to divide a voltage supplied from an offset voltage source to output the offset voltage when an ON signal of the ON/OFF signal is inputted from the offset instructing unit, and a buffer circuit to which the offset voltage is inputted.

5. The motor driving device of claim 4, wherein the first voltage-dividing circuit comprises a first resistor connected at one end to the offset voltage source, a second resistor connected in series to the other end of the first resistor, and a switching element connected in parallel to the second resistor.

6. The motor driving device of claim 4, wherein the buffer circuit comprises a first operational amplifier, the magnification converting circuit comprises a second operational amplifier, and the first operational amplifier and the second operational amplifier are formed into one package.

7. The motor driving device of claim 6, wherein the magnification converting circuit comprises the second operational amplifier and a second voltage-dividing circuit structured to divide an output voltage of the second operational amplifier; the second voltage-dividing circuit is connected to an inverting input terminal of the second operational amplifier to input a negative feedback voltage to the inverting input terminal of the second operational amplifier; and an output voltage of the adder circuit is inputted to a non-inverting input terminal of the second operational amplifier.

8. The motor driving device of claim 1, wherein the microcomputer, the command voltage adjusting circuit, the driving IC and the inverter are arranged on one substrate.

9. The motor driving device of claim 1, further comprising:
    an AC/DC converter circuit structured to convert an AC voltage inputted from the outside to a DC voltage; and
    a converter unit structured to generate, based on the DC voltage, a control voltage to be outputted to the microcomputer.

* * * * *